(12) United States Patent
Conder

(10) Patent No.: US 9,715,551 B2
(45) Date of Patent: Jul. 25, 2017

(54) SYSTEM AND METHOD OF PROVIDING AND REPORTING A REAL-TIME FUNCTIONAL BEHAVIOR ASSESSMENT

(71) Applicant: Michael Conder, Bainbridge, GA (US)

(72) Inventor: Michael Conder, Bainbridge, GA (US)

(*) Notice: Subject to any disclaimer, the term of this patent is extended or adjusted under 35 U.S.C. 154(b) by 247 days.

(21) Appl. No.: 14/700,124

(22) Filed: Apr. 29, 2015

(65) Prior Publication Data

US 2015/0346923 A1 Dec. 3, 2015

Related U.S. Application Data

(60) Provisional application No. 61/986,077, filed on Apr. 29, 2014.

(51) Int. Cl.
| | |
|---|---|
| *G06F 3/00* | (2006.01) |
| *G06F 17/30* | (2006.01) |
| *G06F 3/0481* | (2013.01) |
| *G06F 3/0484* | (2013.01) |
| *H04L 29/08* | (2006.01) |
| *G06F 21/46* | (2013.01) |
| *G06Q 10/00* | (2012.01) |

(52) U.S. Cl.
CPC ...... *G06F 17/30867* (2013.01); *G06F 3/0481* (2013.01); *G06F 3/04817* (2013.01); *G06F 3/04842* (2013.01); *G06F 17/30339* (2013.01); *G06F 21/46* (2013.01); *G06Q 10/00* (2013.01); *H04L 67/22* (2013.01)

(58) Field of Classification Search
CPC .................................................. G06F 3/0482
USPC ........................................................ 715/739
See application file for complete search history.

(56) References Cited

U.S. PATENT DOCUMENTS

| | | | | |
|---|---|---|---|---|
| 2006/0046238 | A1* | 3/2006 | DeGregory | G09B 7/02 434/350 |
| 2006/0172274 | A1* | 8/2006 | Nolasco | G09B 7/02 434/350 |
| 2007/0048705 | A1* | 3/2007 | Belter | G06Q 50/20 434/236 |
| 2007/0165649 | A1* | 7/2007 | Moritz | G06Q 10/00 370/395.64 |
| 2007/0292835 | A1* | 12/2007 | Hartman | G09B 19/00 434/350 |
| 2010/0190142 | A1* | 7/2010 | Gal | G09B 5/00 434/322 |
| 2011/0065082 | A1* | 3/2011 | Gal | G09B 7/02 434/365 |
| 2012/0030257 | A1* | 2/2012 | Conder | G09B 5/00 707/812 |
| 2013/0110737 | A1* | 5/2013 | Shustorovich | G06Q 10/00 705/326 |
| 2013/0143186 | A1* | 6/2013 | Singletary | G09B 19/00 434/236 |

(Continued)

*Primary Examiner* — William Titcomb
(74) *Attorney, Agent, or Firm* — Adrienne C. Love

(57) ABSTRACT

A plurality of web pages prompts a user to record data through a series of graphical user interfaces which provide inputs for a user to select. The data is related to the actions and behavior of individuals being observed and the functional relationship between the individual and his/her environment. The present method provides a means for assessing the data and providing a proposed intervention method and presents the data in a modified form by way of charts, graphs and compiled data for simplicity of use.

16 Claims, 50 Drawing Sheets

(56) References Cited

U.S. PATENT DOCUMENTS

| | | | |
|---|---|---|---|
| 2013/0309642 A1* | 11/2013 | Singletary | G09B 19/00 434/236 |
| 2014/0065592 A1* | 3/2014 | Strang | G09B 5/00 434/350 |
| 2015/0279426 A1* | 10/2015 | Maurer | G11B 27/28 386/241 |

* cited by examiner

FIG. 3

Summary  Graphs  Data

Assessment Summary

The purpose of this functions behavior assessment

| Created by | Created on | Observation Period | School Days | Observing Staff |
|---|---|---|---|---|
| Mike Conder | 04/26/2013 | 04/26/2013 – 05/03/2013 | 6 | Condoer, Mike; Education Specialist |

Student Attendance During Observation

| Present | Absent | Tardy |
|---|---|---|
| 1 | 0 | 0 |

Student Attendance During Observation

| Total Behavioral Event Recorded | Total Observed Events Duration | Average Event Duration | Prevalent Time of Day | Prevalent Day of the Week |
|---|---|---|---|---|

Mike Conder     04/26/2013     04/26/2013 – 05/03/2013     6     Condoer, Mike; Education Specialist

Student Attendance During Observation

| Present | Absent | Tardy |
|---|---|---|
| 1 | 0 | 0 |

Observation Summary

| Total Behavioral Event Recorded | Total Observed Events Duration | Average Event Duration | Prevalent Time of Day | Prevalent Day of the Week |
|---|---|---|---|---|
| 3 | 02:30 Min | 00:50 Min | 10:00 AM – 11:00 AM | Friday |

Assessment Results

Prevalent Behavior Observed     Tantrum

FIG. 24

Assessment Results

Prevalent Behavior Observed  Tantrum

Further results below are in context with the prevalent behavior observed

| Prevalent Subject | Prevalent Context | Prevalent Antecedent | Prevalent Consequence | Prevalent Reaction |
|---|---|---|---|---|
| Math | Group participation | Difficult task | Behavior ignored | Stopped |

| Prevalent Instructor | Total Observed Events Duration | Total Observed Events | Average Event Duration | Prevalent Time of the Day |
|---|---|---|---|---|
| Absire, Taylor | 02:30 Min | 2 | 01:15 Min | 10:00 AM – 11:00 AM |

Prevalent Day of Week  Friday

FIG. 26

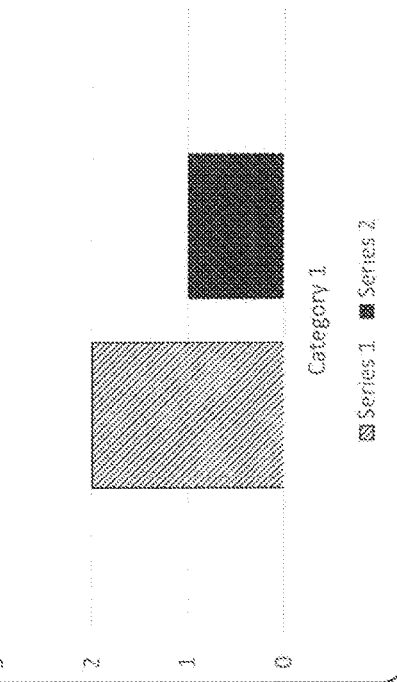
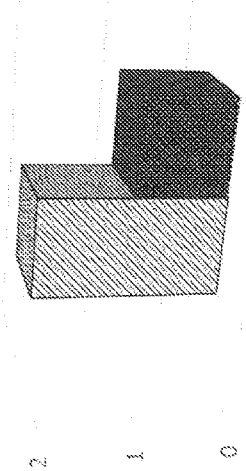
FIG. 30

2 Behavioral Summary

Antecedent:

Antecedent
Target Behaviors:
Context:
Subject:
Consequences:

Time of Day:
Day of Week:
Frequency:
Duration:
Intensity

3 Replacement Behavior
A replacement behavior should serve to take the place of the problem behavior. The student shoud...

FIG. 35

Consequences: _____  Intensity _____

3  Replacement Behavior

A replacement behavior should serve to take the place of the problem behavior. The student should...

- Raise his or her hand to ask for help
- Be granted talking time with peers or staff
- Be given attention on schedule
- Attempt each assignment
- Be given break or a break pass
- Be given a sensory break
- Respond to choices

- Be given a tangible item
- Verbalize frustration appropriately
- Remove self from situation
- Be given attention from a peer tutor or mentor
- Be given peer interaction / skill building
- Other 4  Behavioral Summary

FIG. 36

3  Replacement Behavior
A replacement behavior should serve to take the place of the problem behavior. The student should...

- Raise his or her hand to ask for help
- Be granted talking time with peers or staff
- Be given attention on schedule
- Attempt each assignment
- Be given break or a break pass
- Be given a sensory break
- Respond to choices

- Be given a tangible item
- Verbalize frustration appropriately
- Remove self from situation
- Be given attention from a peer tutor or mentor
- Be given peer interaction / skill building
- Other 4  Behavioral Summary
Instructions for teaching the replacement behavior.

Who will teach? [          ]

What will be taught? [          ]

When will it be applied [          ]

How will the preventative strategies be monitored? [          ]

FIG. 37

- o Be given a sensory break
- o Respond to choices
- o Other

4  Behavioral Summary
Instructions for teaching the replacement behavior.

Who will teach?

What will be taught?

When will it be applied

How will the preventative strategies be monitored?

5  Environment Interventions
These are adjustments that should be made to the student's environment to possibly reduce the occurrence of the problem behavior

FIG. 38

5 Environment Interventions
These are adjustments that should be made to the student's environment to possibly reduce the occurrence of the problem behavior

A Environment Interventions

- Change seating arrangement
- Relocate key people that may contribute to the problem behavior
- Remove visible items that may be trigger mechanisms for the behavior
- Change travel pathways to various areas in room
- Change visual paths by installing blinds dividers, etc.
- Other explain: _____

B Can adjustments be made during the time period the problem behavior is likely to happen?

- Change subject time
- Reduce social time exposures that may trigger problem behavior
- Remove visible items that may be trigger mechanisms for the behavior
- Increase peer or mentor time
- Other explain: _____

FIG. 39

6 Instructional Interventions

What social skills actively can the student complete to fully and successfully demonstrate the replacement behavior

A
- Role play
- Behavior modeling
- Social stones
- Individual interactions by staff or mentor
- Group institution
- ABE interventions
- Activity book
- Guided practice
- Other explain: _____

What communication skills actively can the student complete to fully and successfully demonstrate the replacement behavior

- One-on-one discussion with teacher
- Journal writing for social expression
- Student mentor meetings
- Group discussions
- Role play
- Other explain: _____

What study skills actively can the student complete to fully and successfully demonstrate the replacement behavior

C
- Written explanation of task
- Verbal explanations of task
- Seat work with scheduled breaks
- Scheduled mentor times
- Scheduled tutor times
- Scheduled quiet time
- Group participation of subject review
- Other explain: _____

Who will be responsible for providing skill instructions?

D
- Classroom teacher

FIG. 41

Who will be responsible for providing skill instructions?

- Classroom teacher
- Mentor
- Class paraprofessional
- Professional services personnel
- Other explain: _____

How often will this instruction be taught?

- Daily
- Weekly
- Biweekly
- Monthly
- As needed
- Other explain: _____

Where will the instruction be taught?

FIG. 42

7  Reinforcement Procedures

A. What reinforcement should be used to increase the occurrence of the replacement behavior?

- Teachers and
- Recess or other tree name
- Treats
- Peer social time
- Award or visual acknowledgement
- ABE Behavior Bucks
- Special person award
- Verbal acknowledgement
- Other explain: _____

B. What is required of the student to earn the reinforcement? (Select all that apply)

FIG. 43

C How frequently can the student earn the reinforcement?

- As needed per event
- Hourly
- Twice a day
- Daily
- Weekly
- Other explain: _____

D What correction procedure will be used to decrease the problem behavior?

- Problem behavior will be ignored in favor of correct behavior
- Stopping the student and redirecting
- Re-teaching the replacement behavior
- Compentary behavior intervention
  - Role play
  - Social story
  - Specific skill set instructions
  - Other explain: _____
- Specific commands for acknowledgement
- Imposing consequences
  - Loss of privileges for sat time

FIG. 44

- Role play
- Down time for set time
- Parent call
- Other explain: _____

Will a behavior contract the specifics replacement behavior, specific reinforcement and consequences for problem behavior be created?

- Yes
- No

FIG. 45

- Progress Monitoring
  - Progress monitor
    Date to Start [ ]  Date to Find [ ]

Observer(s)
  Select the observer(s) to include in the Progress Monitor

Select Staff Member
  [Select Teacher ▾]

FIG. 46

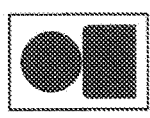
Ben Bean
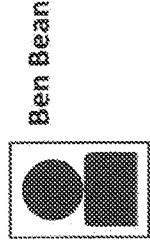
T Jones
9   Notes:
Need for attention
FIG. 48

FIG. 49

SYSTEM AND METHOD OF PROVIDING AND REPORTING A REAL-TIME FUNCTIONAL BEHAVIOR ASSESSMENT

Pursuant to the provisions of 37 C.F.R. §1.53(c), this non-provisional application claims the benefit of an earlier-filed provisional patent application. The earlier application was assigned Ser. No. 61/986,077. It lists the same inventor.

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of computer software behavioral systems. More specifically, the present invention comprises a computer-implemented software product that executes a method and system for assessing, recording and modifying behavior in a behavior pattern.

2. Description of the Related Art

Various systems and computer implemented methods exist for collecting and recording information relating to the behavior of children in an educational setting. As information is collected and recorded, it can be assessed and used to encourage or modify behavior.

Behavioral modification is a form of behaviorism, wherein behavior change techniques are used to increase or decrease the frequency of particular behaviors. There have been many methods of tracking and analyzing an effort to modify an individual's behavior. Most commonly, a behavior analyst observes and tracks an individual's interaction with the environment. Certain assessments are made based on the relationship between specific environmental events and behaviors. These assessments can be used to identify particular controlling variables for challenging behaviors. Thus, interventions could be provided which targeted the functional relationship between the behavior and the environment. This process and system of assessing behavior for purposes of intervening to change a behavior is called "functional behavior assessment" or "FBA".

Educational institutions or other similar organizations are often tasked with a large role in tracking a student's behavior in order to reduce unwanted behavior or increase desirable behavior. In order to do so, the entity must collect accurate data on individuals relating to both the environment and the individual's interaction with and response to the environment. The accuracy and thoroughness of the data is important and there are criteria that must be met in order to provide a functional behavior assessment. However, many institutions or organizations are ill-equipped to accurately track and collect data about one individual's behavior. In order to collect thorough data an individual should be observed on a consistent basis and data should be recorded contemporaneously with the occurrence of the behavior and environmental stimuli. In most entities, a supervising individual is attempting to teach or supervise a large group of students and therefore may not be capable of accurately observing one individual's behavior and surrounding environmental triggers. Even if the behavior is accurately observed, the supervising individual may not be capable of contemporaneously recording the data. Therefore data may be skewed, incomplete or inaccurate.

Therefore, what is needed is a system and method of tracking and collecting data in real-time coupled with the ability to accurately compile data to assess an individual's interaction with the environment.

BRIEF SUMMARY OF THE PRESENT INVENTION

The computer-implemented method and system provides a computer program product comprising a computer usable medium (client server) which is capable of accessing a database server or other storage medium having a computer readable code. The database server includes a series of web pages and linked databases that make-up the computer program product. A first user logs into the present product by providing a user ID and password. The user ID and password are matched to a client table database. The client table database is capable of providing the user with a user specific sub-set of data. The sub-set of data may the data that was entered by that user or it may be data that was written to the database by another user.

A plurality of web pages prompts a user to record data through a series of graphical user interfaces which provide inputs for a user to select. The data is related to the actions and behavior of individuals being observed and the functional relationship between the individual and his/her environment. The present method provides a means for assessing the data and providing a proposed intervention method and presents the data in a modified form by way of charts, graphs and compiled data for simplicity of use.

BRIEF DESCRIPTION OF THE SEVERAL VIEWS OF THE DRAWINGS

FIG. 3 is a screen shot showing a user interface with options for selecting a particular class provided by the present method

FIG. 9 illustrates a screen shot showing a user interface for entering an assessment summary provided by the present method.

FIG. 12 illustrates a screen shot showing a user interface for recording an observation by way of selecting an icon provided by the present method.

Figure 13:
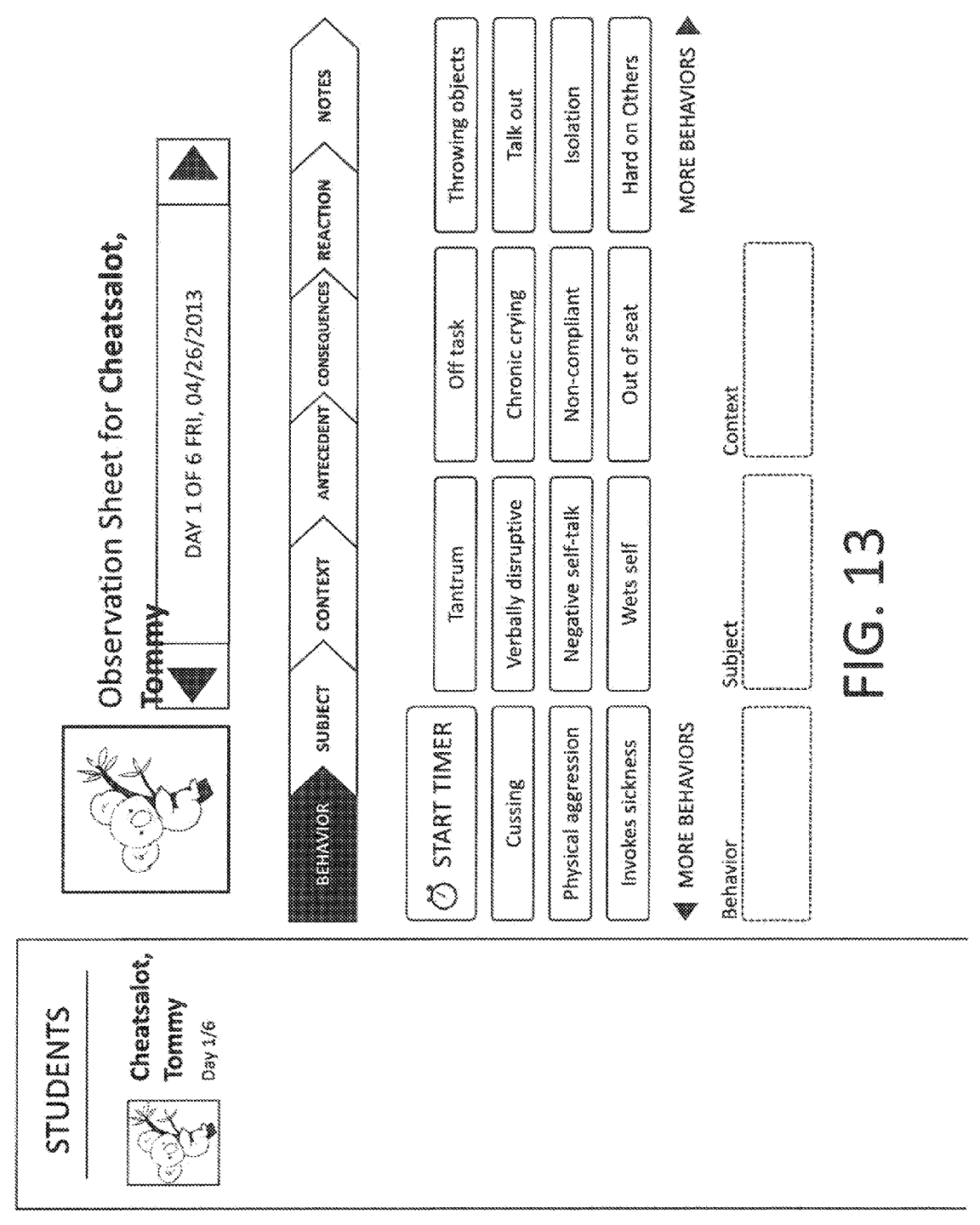

FIG. 13 illustrates a screen shot showing a user interface for selecting a behavior by way of an icon as a behavior is occurring provided by the present method.

Figure 17:
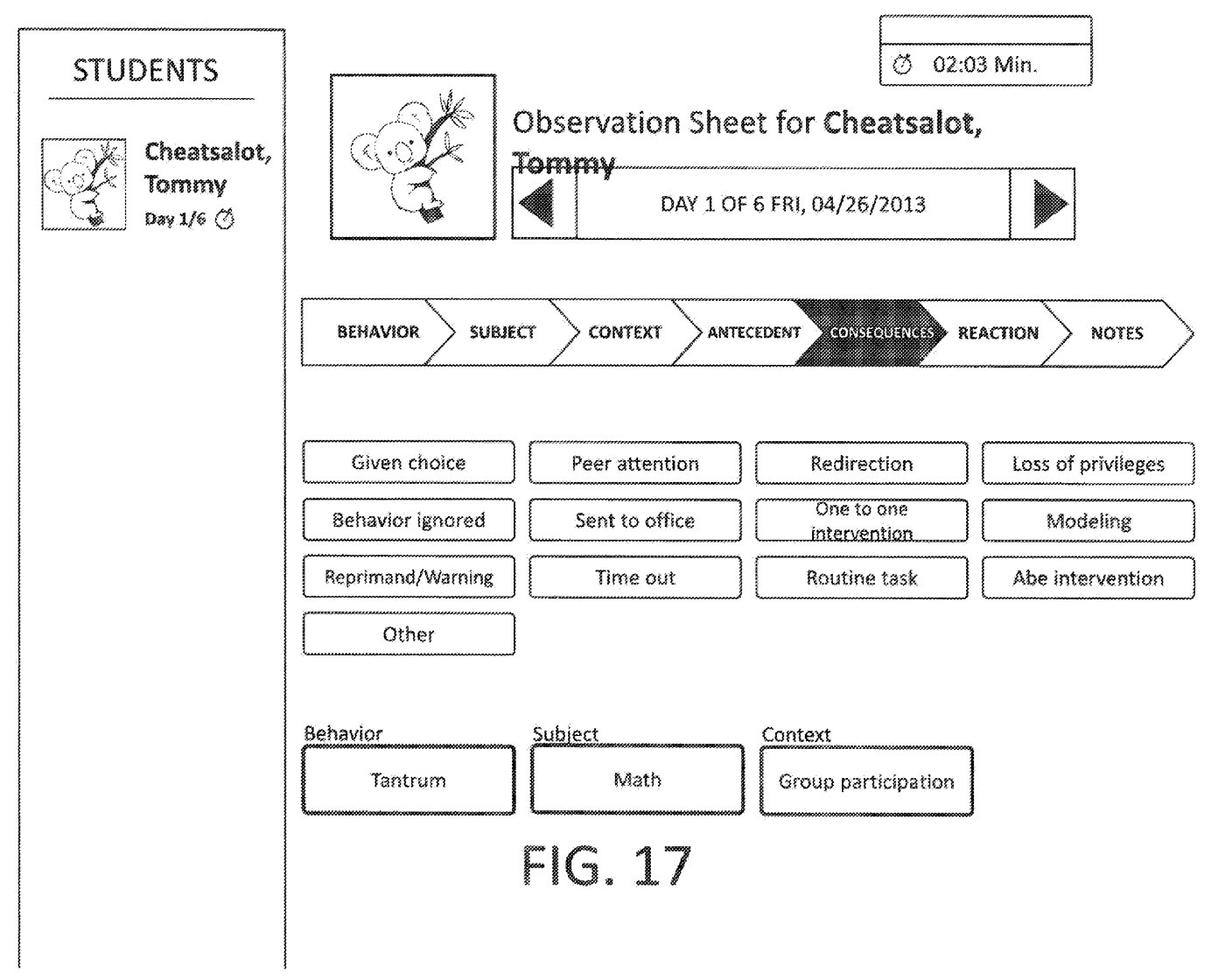

FIG. 17 illustrates a screen shot showing a user interface for selecting an icon, representing the consequence of a behavior, as provided by the present method.

Figure 18:
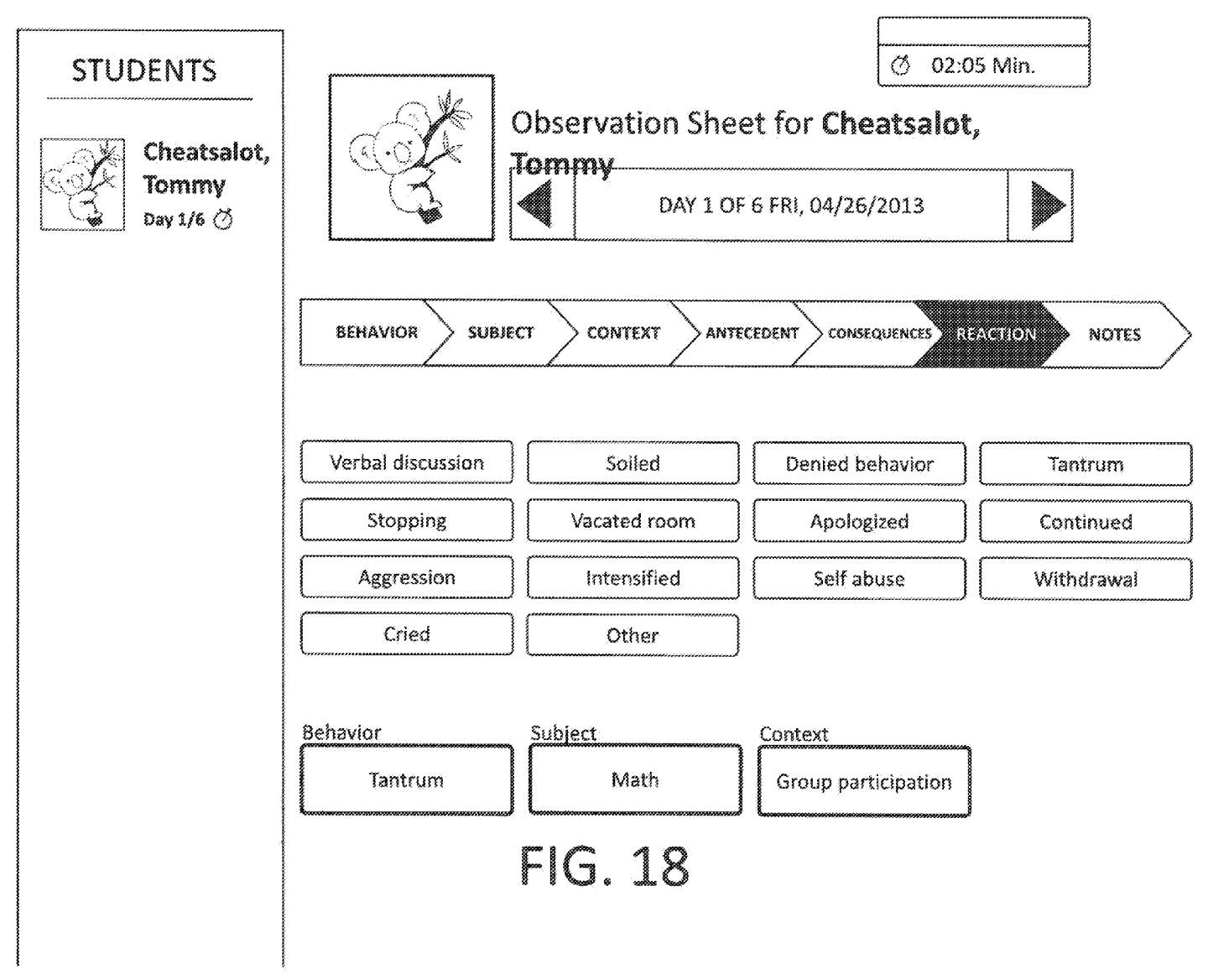

FIG. 18 illustrates a screen shot showing a user interface for selecting an icon, representing the reaction of the individual, as provided by the present method.

Figure 20:
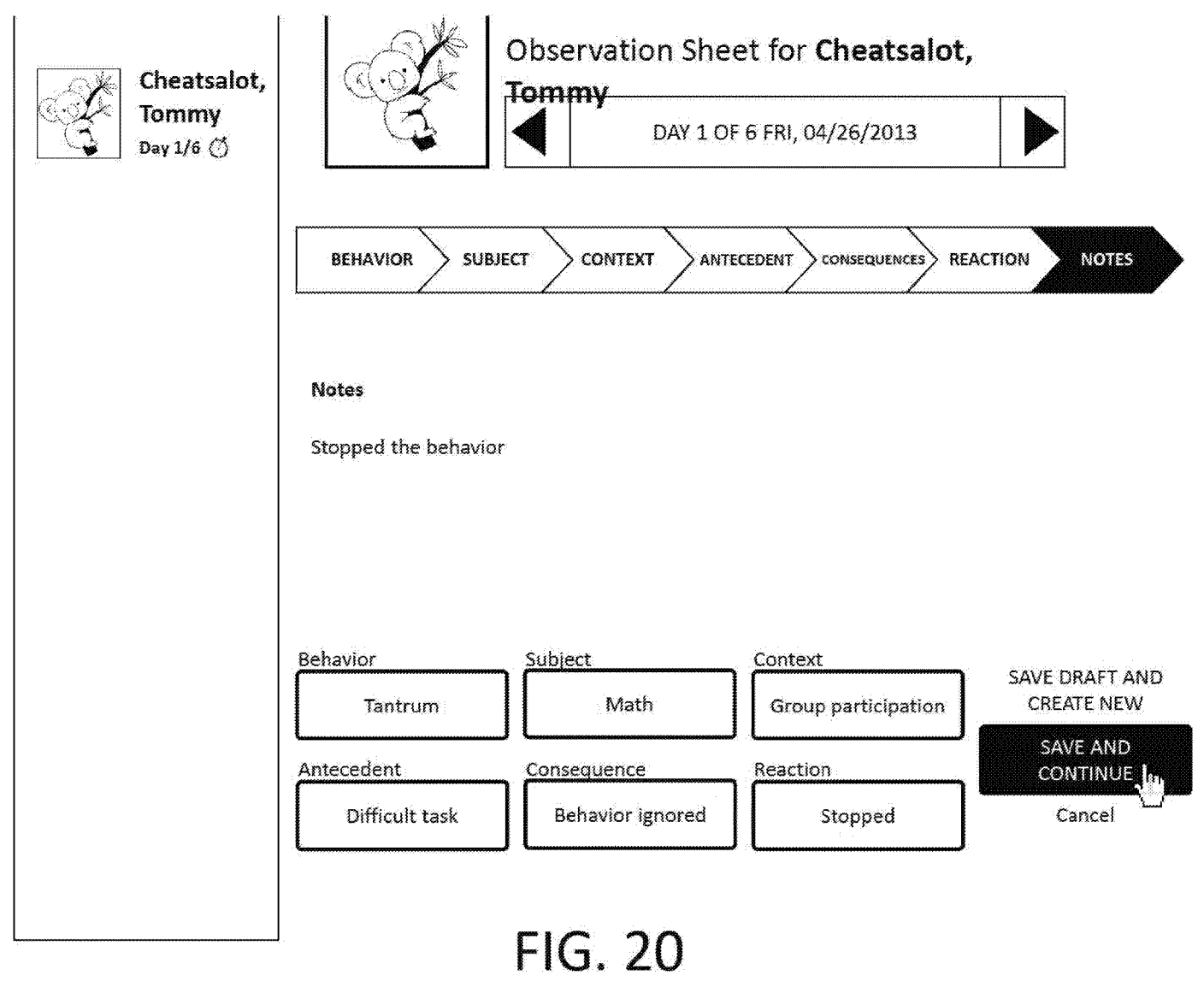

FIG. 20 illustrates a screen shot showing a user interface for saving the note to a particular observation, as provided by the present method.

Figure 21:
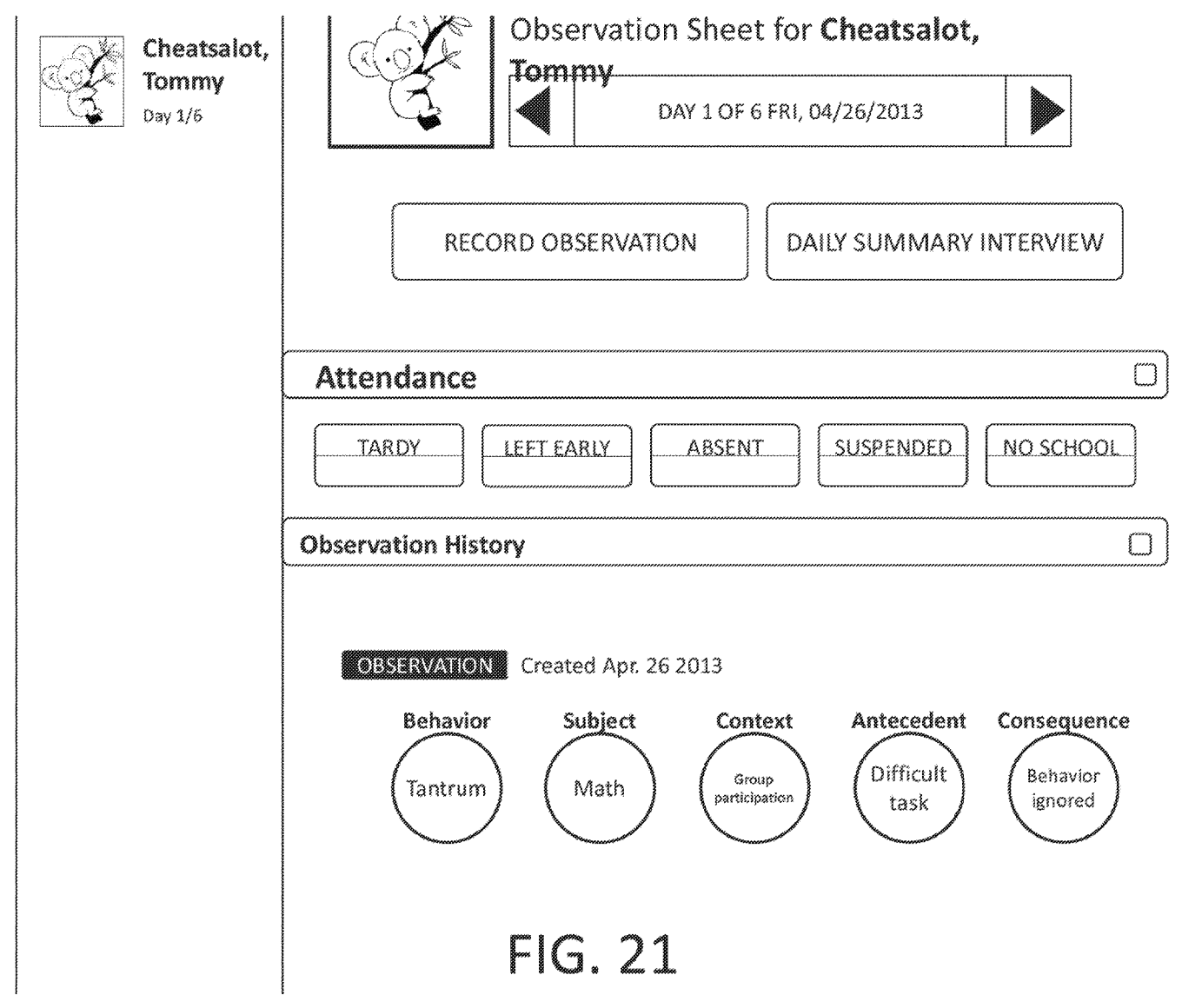

FIG. 21 illustrates a screen shot showing a user interface for viewing a recorded observation, as provided by the present method.

FIG. 24 illustrates a screen shot showing a user interface for viewing aggregate data inputted by the user in the present method.

FIG. 26 illustrates a screen shot showing a user interface for viewing aggregate data from an assessment in the present method.

FIG. 30 illustrates a screen shot showing a user interface for viewing data, as provided by the present method.

FIG. 35 illustrates a screen shot showing a user interface for a behavioral summary input, which can be automatically populated based on previous inputs of the user, as provided by the present method.

FIG. 36 illustrates a screen shot showing a user interface for selecting a replacement behavior, as provided by the present method.

FIG. 37 illustrates a screen shot showing a user interface for providing a preventative strategy, as provided by the present method.

FIG. 38 illustrates a screen shot showing input into a preventative strategy input screen, as provided by the present method.

FIG. 39 illustrates a screen shot showing the options for selecting environmental interventions, as provided by the present method.

FIG. 40 illustrates a screen shot showing the options for selecting an instructional intervention, as provided by the present method.

FIG. 41 illustrates a screen shot showing additional options for selecting an instructional intervention, as provided by the present method.

FIG. 42 illustrates a screen shot showing additional options for selecting an instructional intervention, as provided by the present method.

FIG. 43 illustrates a screen shot showing options for selecting a reinforcement procedure, as provided by the present method.

FIG. 44 illustrates a screen shot showing options for selecting a reinforcement procedure, as provided by the present method.

FIG. 45 illustrates a screen shot showing additional options for selecting a reinforcement procedure, as provided by the present method.

FIG. 46 illustrates a screen shot providing inputs for progress monitoring, as provided for by the present method.

FIG. 48 illustrates a screen shot showing inputs for providing additional notes, as provided in the present method.

FIG. 49 illustrates a screen shot showing an overview of actions on particular cords, as provided in the present method.

FIG. 50 shows a block diagram showing the servers which the present invention is stored and executed on.

DETAILED DESCRIPTION OF INVENTION

The present invention is a computer program product 10 to implement a method and system of functional behavior assessment. The method requires an individual who desires to assess a second individual. For clarity, a school is used as an example of an implementation of the present computer program product. However, any organization or entity authorized to review, assess and record an individual's behavior could use the present system.

Figure 50:
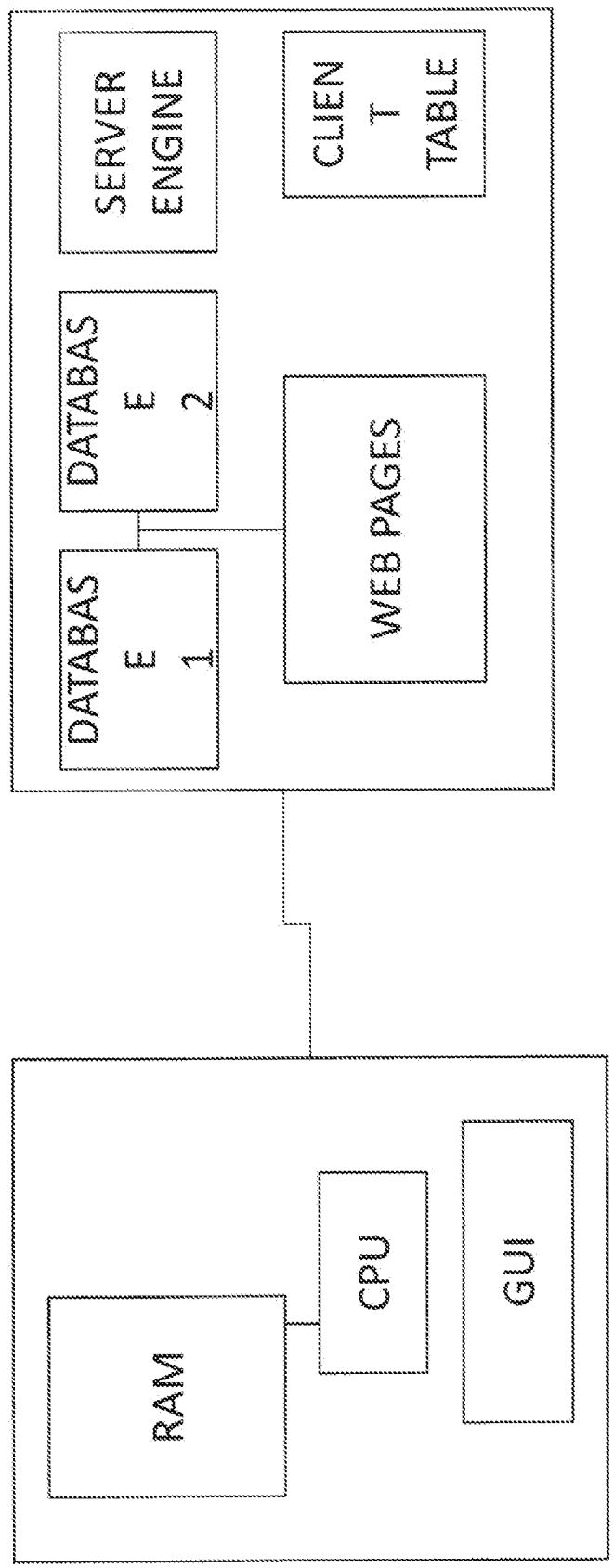

As illustrated in FIG. 50, the method provides computer program product 10 comprising a computer usable medium (client server) which is capable of accessing a database server or other storage medium storing a computer readable code. The database server includes a series of web pages and linked databases that make-up the computer program product. A first user logs into the present product by providing a user ID and password. The user ID and password are matched to a client table database. The client table database is capable of providing the user with a user specific sub-set of data. The sub-set of data may be data that was entered by that user or it may be data that was written to the database by another user.

A plurality of web pages prompts a user to record data through a series of graphical user interfaces which provide inputs for a user to select. As explained herein, the data is related to the actions and behavior of individuals being observed and the functional relationship between the individual and his/her environment. The present method provides a means for assessing the data and providing a proposed intervention method and presents the data in a modified form by way of charts, graphs and compiled data.

Figure 1:
FIG. 1 is a screen shot showing a user interface for selecting a particular organization provided by the present method.

A series of screen shots from the present method describe the method of implementing the present method. FIG. 1 illustrates a screen shot of the present method after a user logs into the present computer program product. The user is able to view all schools that are linked to the user's account (per the client table within the database server). A user can be provided different levels of access. The user can select the school name in order to monitor the activity at that particular school. Further, a user may only have access to one school or a sub-set of classes within a particular school. Again a school is used as an exemplar organization for the present method; however, any entity can utilize the present system for functional behavior assessment.

Figure 2:
FIG. 2 is a screen shot showing a user interface with an overview for the particular organization selected provided by the present method.

As illustrated in FIG. 2 the present invention provides an overview screen having a series of tabs which allow a user to easily view statistics relating to the relevant school selected pursuant to FIG. 1. The user is also able to view a tasks tab which drops down to reveal a series of notifications to the user. If a category contains an active notification the present method alerts the user to the particular notification. In this example, a red quotation box with a number is provided that represents the number of notifications are present in a particular subsection of the tasks tab. The user can enter any one of the icons identified by the relevant tabs based on the action that the user desires to take.

Figure 3:
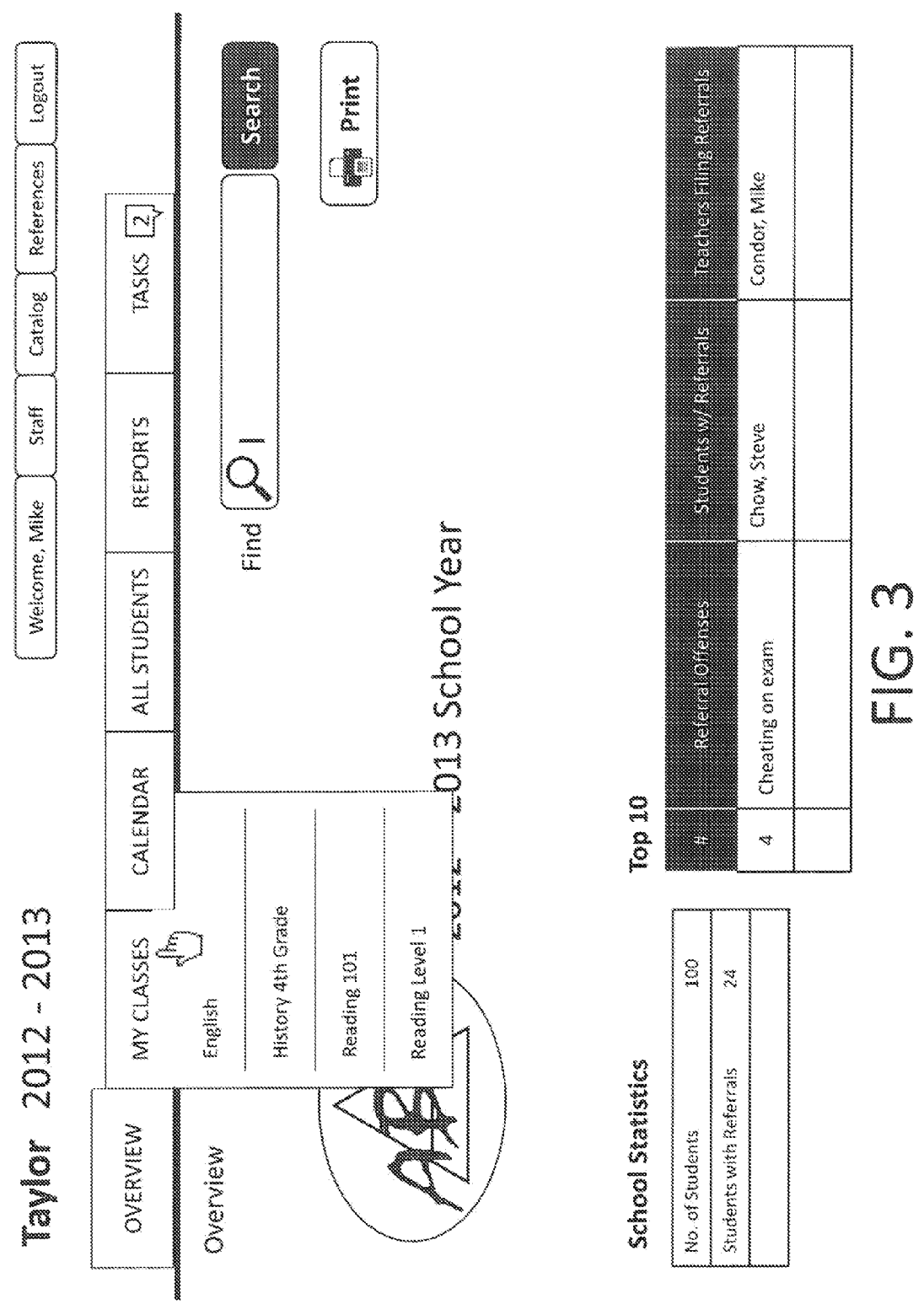
Figure 4:
FIG. 4 illustrates a screen shot showing a user interface with a class listing provided by the present method.
Figure 5:
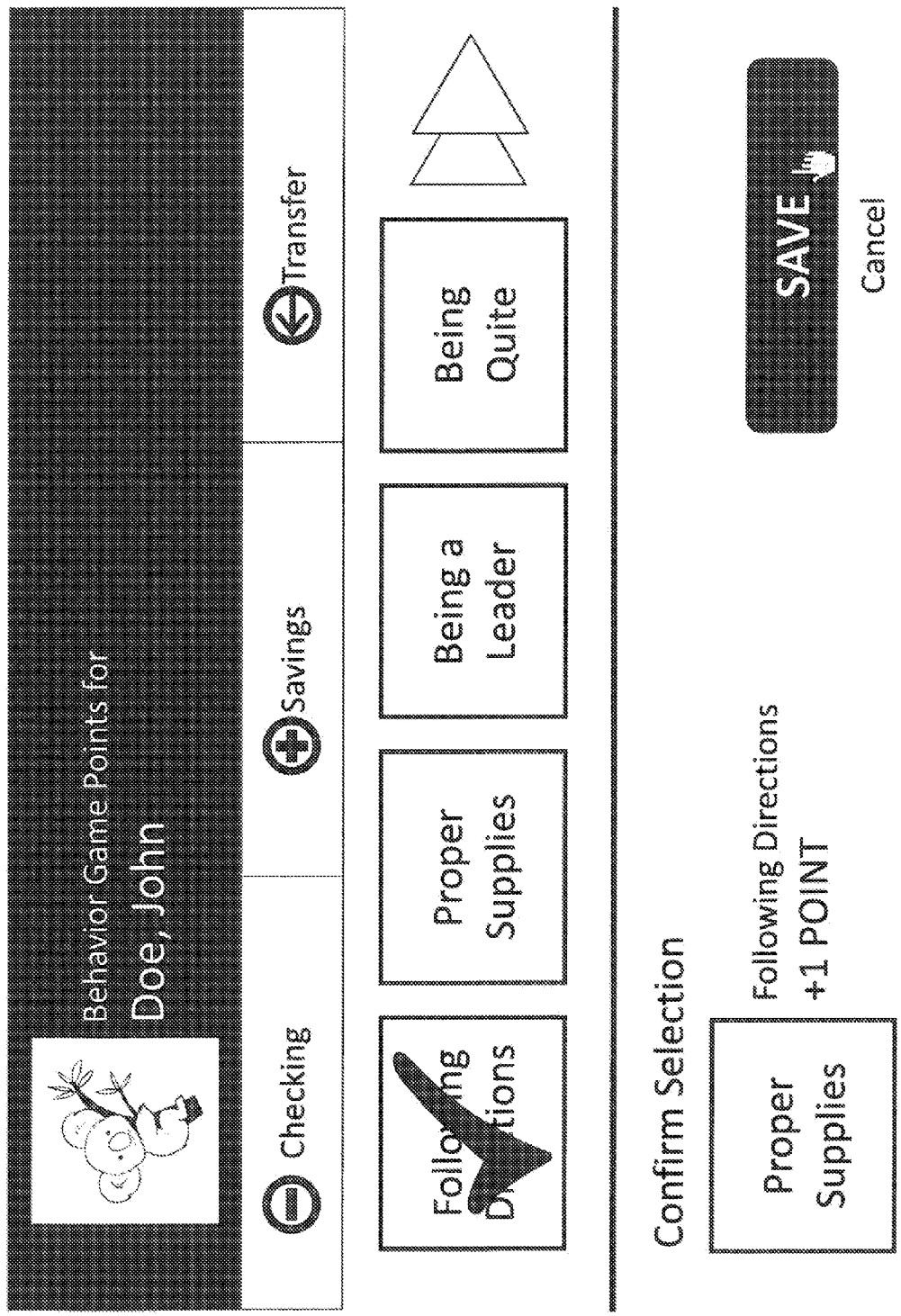
FIG. 5 illustrates a screen shot showing a user interface for entering information relating to an individual provided by the present method.
Figure 6:
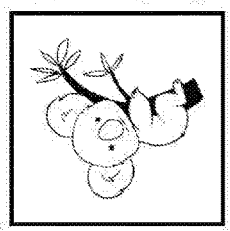
FIG. 6 illustrates a screen shot showing a user interface for an organizational calendar of event recordings provided by the present method.
Figure 7:
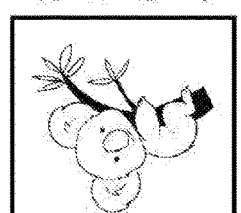
FIG. 7 illustrates a screen shot showing a user interface for providing a functional behavior assessment provided by the present method.

If the user selects the "My Classes" tab, a drop down menu appears which lists classes that the user is able to select, as shown in FIG. 3. Upon selecting a class, a student listing, complete with easily viewable icons and names. This class listing is illustrated in FIG. 4. The program permits the teacher to use an immediate reward system by way of adding to a students "checking" and/or "savings" accounts. In one scenario, the teacher could display the user interface shown in FIG. 4 to the class to allow the students to watch in real-time as the teacher adds points to a student's account for desired behavior. The class would therefore participate in a behavior game, wherein the students could either view in real-time or log on and check their own particular points. FIG. 5 shows the selection by the user (or teacher, in this embodiment) of a student who has behaved in a desirable manner. The user clicks on a simple icon, which allows the teacher to select the behavior quickly and in an active environment. The icon, in the present instance, indicates that the student followed directions and is awarded +1 point. The student is immediately rewarded for the behavior (and thereby encouraged to repeat that behavior) and the user can save the selection. As illustrated in FIGS. 6-7 the student's participation and activities in the behavior game are tracked and recorded by date.

Figure 8:
FIG. 8 illustrates a screen shot showing a user interface for entering a new functional behavior assessment provided by the present method.
Figure 10:
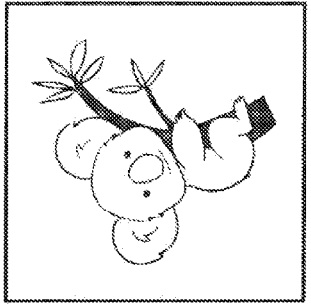
FIG. 10 illustrates a screen shot showing a user interface for entering and viewing a functional behavior assessment provided by the present method.
Figure 11:
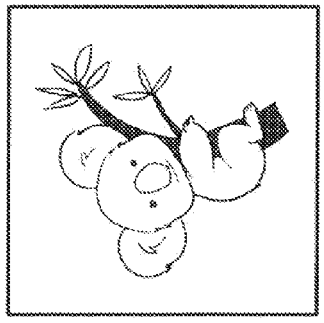
FIG. 11 illustrates a screen shot showing a user interface for alerting the user that a functional behavior assessment is in progress provided by the present method.
Figure 14:
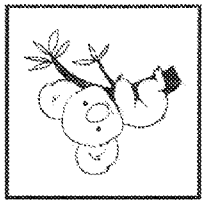
FIG. 14 illustrates a screen shot showing a user interface where a user is selecting a behavior provided by the present method.

FIG. 7 illustrates a screen shot of the user selecting to create a new functional behavior assessment relating to a specific student. Once selected, FIG. 8 shows the menu for the student that is displayed. The present method includes required inputs that are necessary to meet the criteria of a proper functional behavior assessment. The method thereby prevents errors that may result if a user does not enter a field or input a value in a form. For example, an observation period is required for a functional behavior assessment—the present method requires input of the observation period first in order to begin a functional behavior assessment for a student. Once the user inputs the observational period and saves the information an assessment summary is presented on a user interface, as illustrated in FIG. 9. The assessment summary provides information relating to the assessment. As shown in FIG. 10, if the assessment is currently active or in progress, that information is provided at the top of the user interface for the particular FBA. The user will also see an active notification in the drop down menu of the tasks tab—showing that a functional assessment or FBA is active, as shown in FIG. 11. The user can browse away from the user interface showing the active FBA, but easily return to the screen by selecting the tasks tab and active FBA icon.

Figure 12:
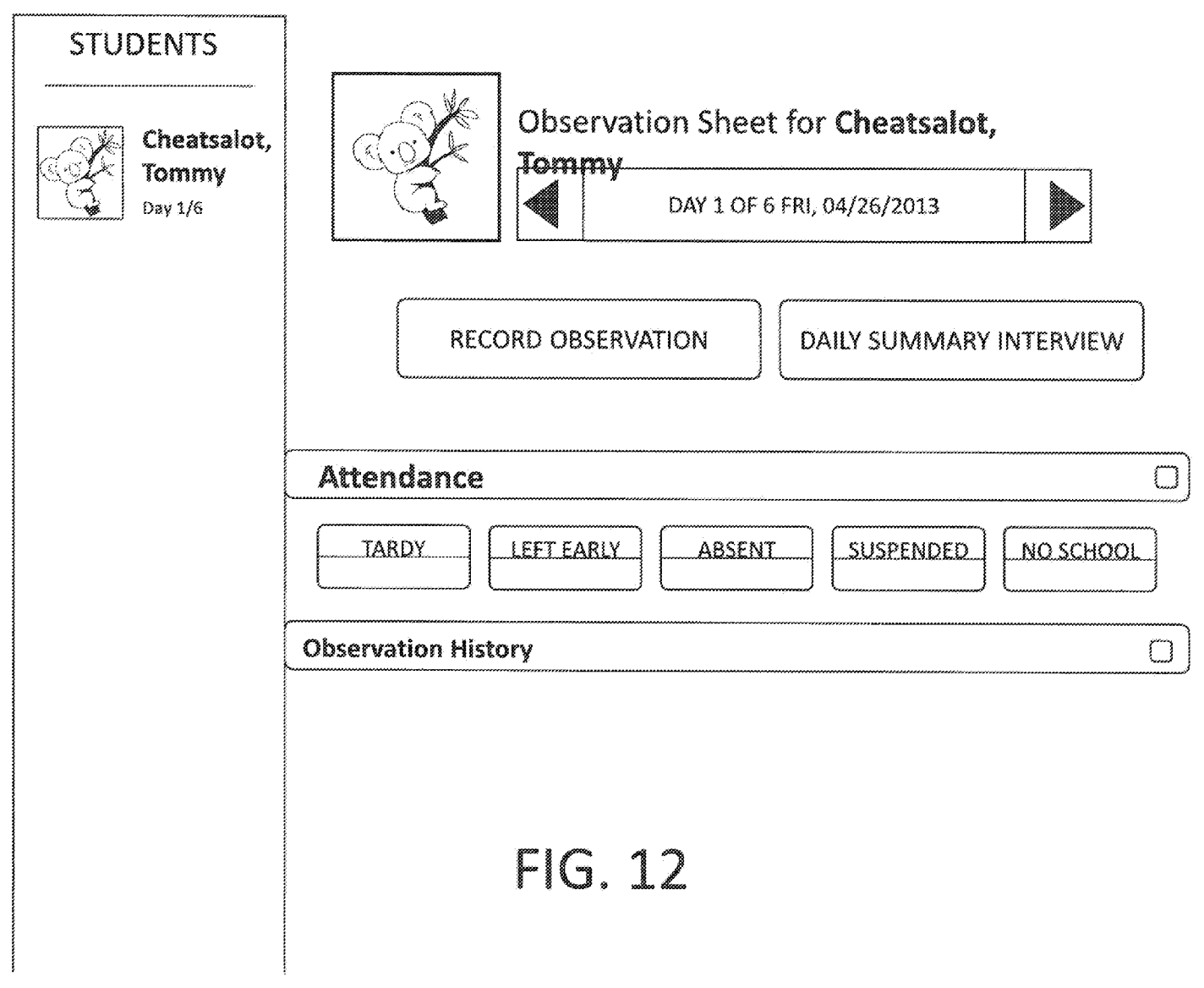

The user can easily track attendance of the student undergoing the FBA during the observation period. A simple user interface provides for several options relating to the student's attendance, as illustrated in FIG. 12. If the student is in attendance and is being observed in the context of a FBA, on a particular date, the user will be brought to an observation sheet, illustrated in FIG. 13. The observation sheet allows for real-time tracking of a particular behavior and observations relating to the particular behavior. One key benefit to the system is the structured set of icons that the user has access to. The structured sets of icons are illustrated in FIGS. 13-20. The present method provides a picture (visual depiction) coupled with a simple description of the behavior. The method has provided a group of common behaviors and the ability to enter new behaviors if necessary. When a student begins a behavior the user can nearly simultaneously select the behavior which triggers the start of the timer. It is in this manner that the user tracks the behavior in real-time. As the reader will appreciate, recording a behavior in real-time creates a more accurate reflection of a behavior than recording the information from an individual's memory after the fact. The individual recording the information after the fact may make errors in estimating the amount of time that the behavior occurred, classify the behavior incorrectly and/or entirely forget to record the event due to distractions from other students or tasks. By allowing real-time recording and pre-entered icon selection the present method avoids common errors which lead to inaccurate data.

Figure 15:
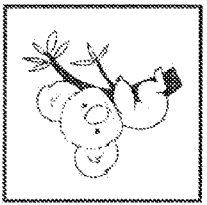
FIG. 15 illustrates a screen shot showing a user interface for selecting an icon, representing the context in which a behavior occurred, as provided by the present method.
Figure 16:
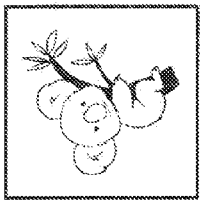
FIG. 16 illustrates a screen shot showing a user interface for selecting an icon, representing the antecedent to the behavior, as provided by the present method.
Figure 19:
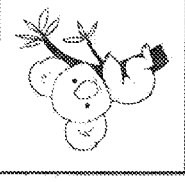
FIG. 19 illustrates a screen shot showing a user interface for inputting a note within the particular observation, as provided by the present method.
Figure 22:
FIG. 22 illustrates a screen shot showing a user interface for viewing a recorded observation, as provided by the present method.
Figure 23:
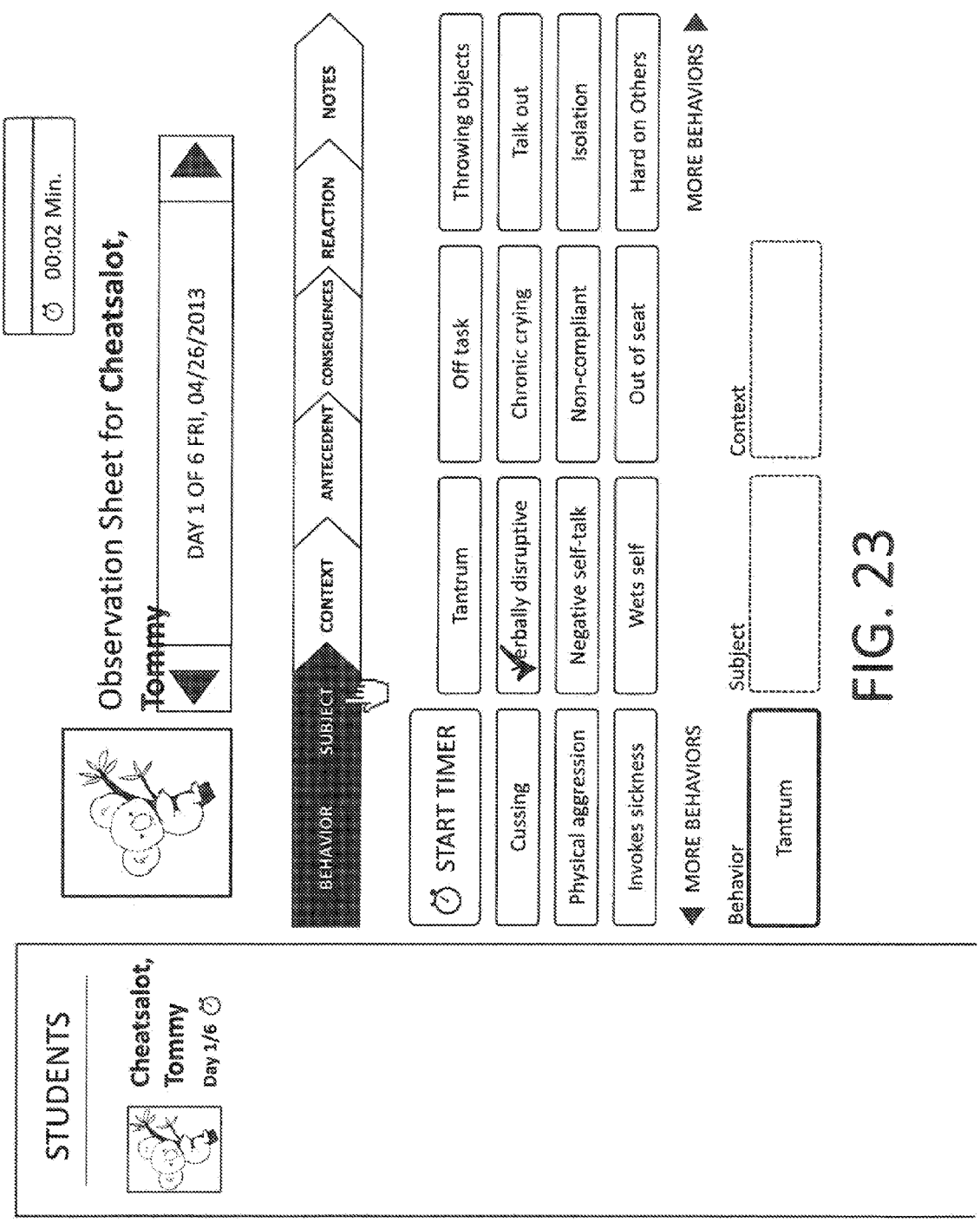
FIG. 23 illustrates a screen shot showing a user interface for a inputting a second observation, as provided by the present method.
Figure 25:
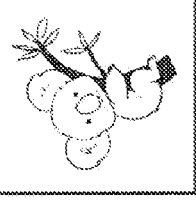
FIG. 25 illustrates a screen shot showing a user interface for collecting data from third party individuals and recording that date, as provided by the present method.
Figure 27:
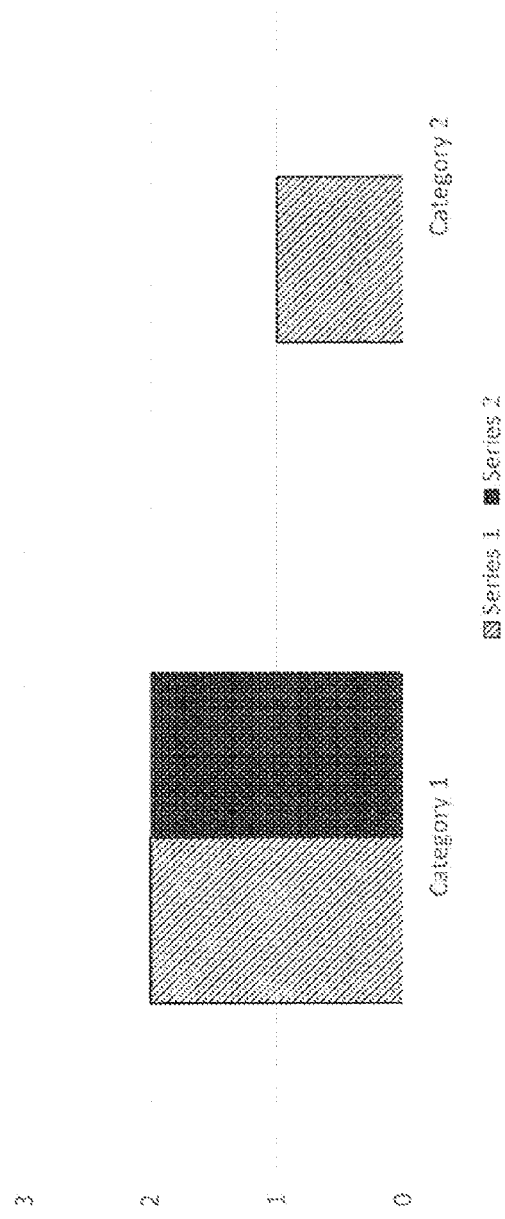
FIG. 27 illustrates a screen shot showing a user interface for viewing data in a chart provided by the present method.
Figure 28:
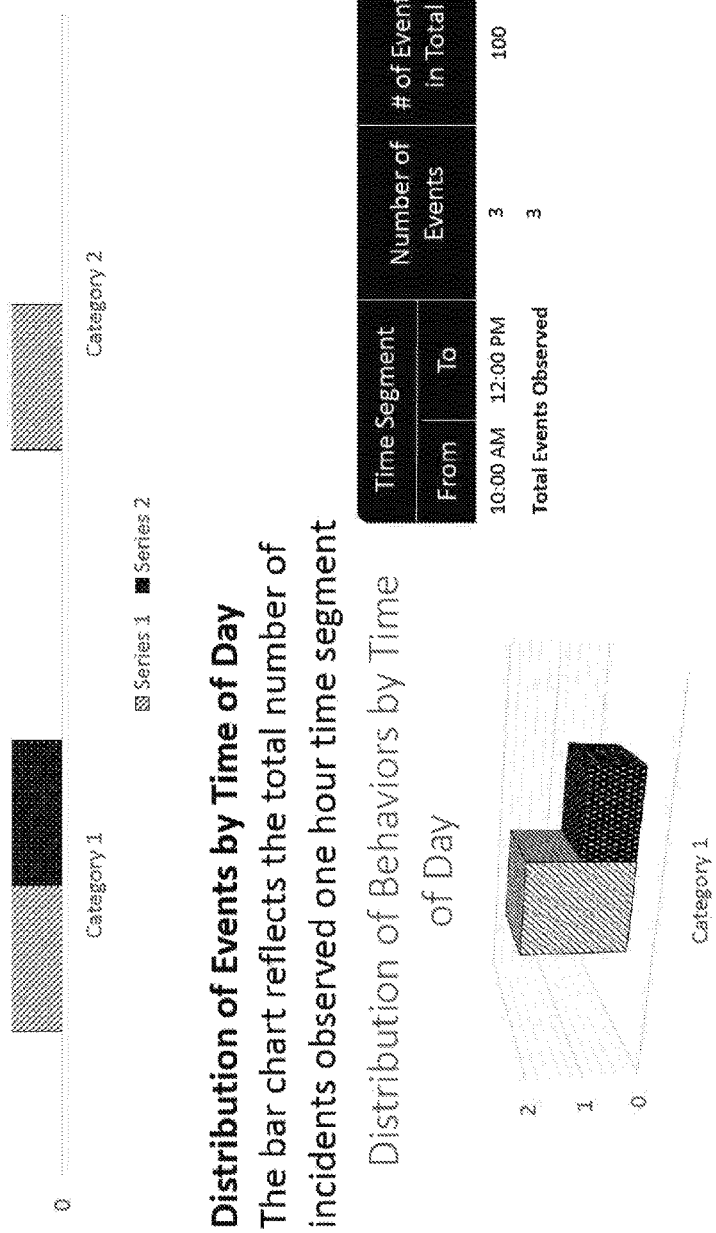
FIG. 28 illustrates a screen shot showing a user interface for viewing data, as provided by the present method.
Figure 29:
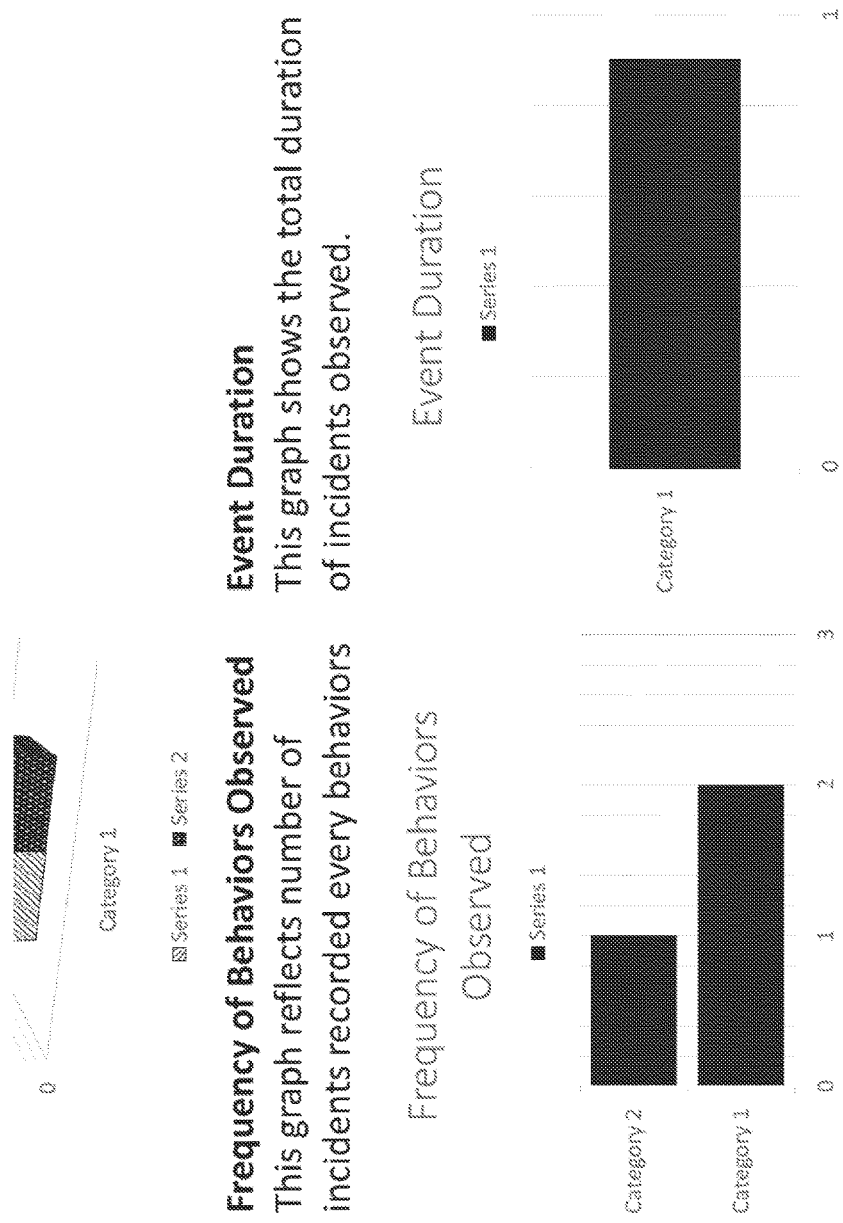
FIG. 29 illustrates a screen shot showing a user interface for viewing data, as provided by the present method.
Figure 31:
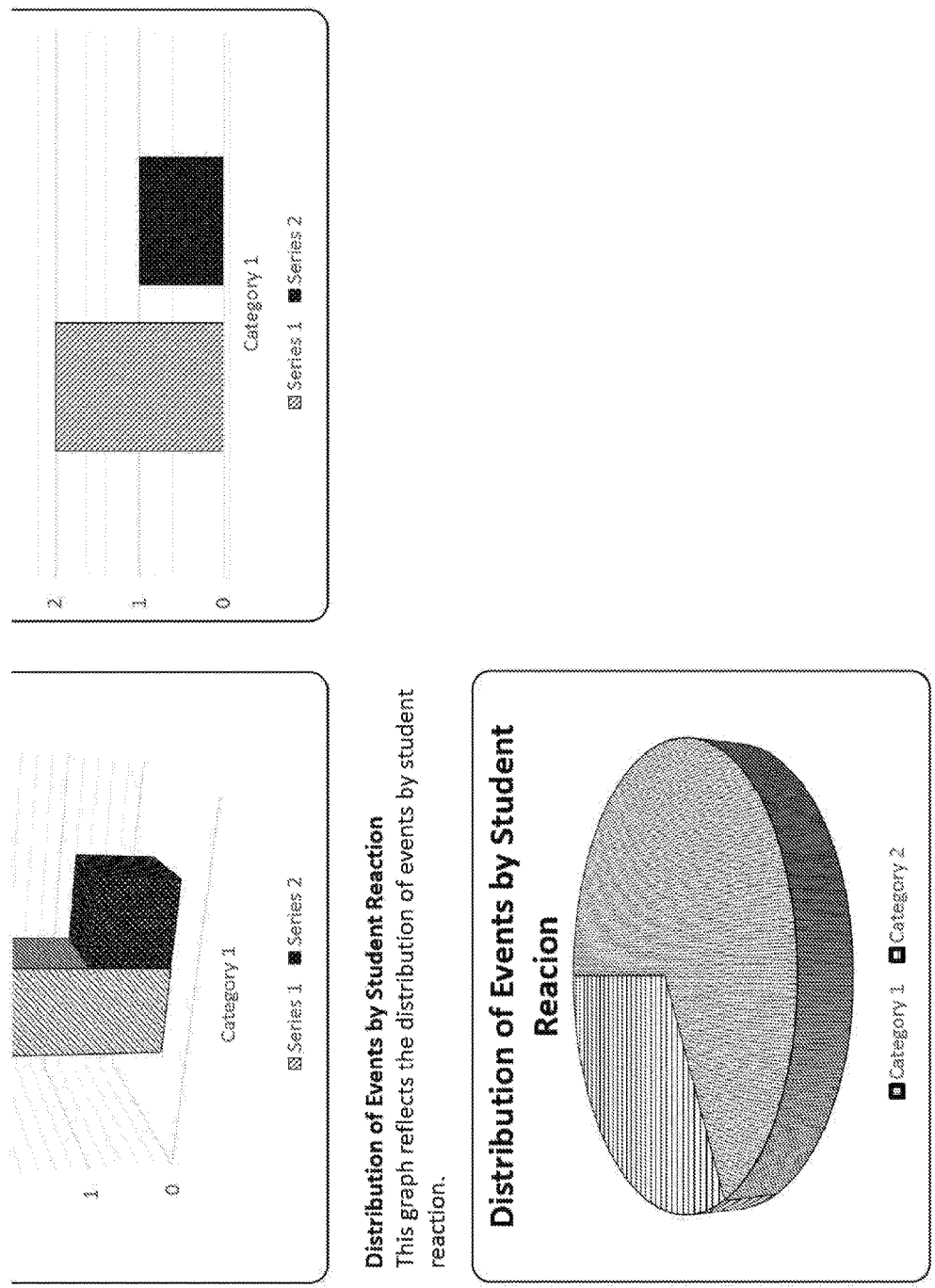
FIG. 31 illustrates a screen shot showing a user interface for viewing data, as provided by the present method.

FIG. 13 illustrates a plurality of behavior icons for the user to select from. As an example, if a student begins a tantrum, the user selects the icon representing a tantrum, shown in FIG. 14. When the icon is selected, the timer begins, thereby creating a real-time record of the ongoing behavior. As the behavior is occurring, the user can continue to observe and input data about the behavior. For example, FIG. 15 shows that the user can select "Subject" or "Context" as the behavior is occurring. This allows the user to easily select what particular subject the class was engaged in when the behavior began and in what context. In the present example, the user has recorded that the class was studying math in the context of individual participation when the behavior began. As illustrated in FIG. 16, the behavior is still occurring as the user records the "Antecedent" to the behavior. In this case, the user determines that the behavior (e.g. tantrum) began during a difficult task for the student. Next, as shown in FIG. 17, the user can input the consequence of the behavior. In this case, the consequence of the student's behavior was that the behavior was ignored. The icon is selected and thereby recorded in connection with the observation. Moving to FIG. 18 and the "Reaction," another series of icons is displayed. In this case, the student reacted by stopping the behavior (e.g. tantrum) while the behavior was being ignored. Finally, as illustrated in FIGS. 19-20 specific notes can be entered by the user relating to the observation. The observation can be saved at any point in the process or a draft can be saved and returned to at a later time. During the Observation, the user is able to easily browse and select icons as the behavior is occurring, primarily due to the structured icon display and the timer which runs along with the tracked behavior. Once completed and saved, the observation can be viewed in an "observation history" section within the particular FBA. The observation history user interface is shown in FIGS. 21-22. If a second behavior occurs while a student is being observed for an FBA, the user can create a second observation. As shown in FIG. 23, the second observation is recorded in the same means as the first. When the observations are complete, the user can return to a summary page, shown in FIGS. 24 and 26. The summary section allows a user to view the compiled data retrieved from the databases over a period of time or observation events for the particular student or relevant FBA. Therefore, the user is able to easily visualize patterns. For example the user can view the number of events records, the during of time over which the events spanned, the average event duration, the prevalent time of the day that the events occurred, the prevalent day of the week and the prevalent behavior observed. The data can be compiled in any way known to one skilled in the art. One purpose of gathering the date is to identify patterns and constants relating to the individual's interaction with the environment. The aggregated and organized data can greatly assist in identify the cause of the problem for the students behavior and/or provide a means for correcting the behavior by properly identifying the necessary intervention for a particular student. A daily summary interview, shown in FIG. 25, is provided to allow the user to input additional information relating to the observation. The user may present input in the form of an interview for the student and/or the teacher. Other supervisors or teachers may also be interviewed to provide feedback relating to the assessment.

FIGS. 27-31 illustrate a series of charts and graphs which provide fast time feedback relating to the data inputted by the user. The data can be compiled and displayed in manner different ways. As shown, the charts provide a visual guide to the interaction of the student with his/her environment.

Figure 32:
FIG. 32 illustrates a screen shot showing a user interface for viewing an overview of a selected organization, as provided by the present method.
Figure 33:
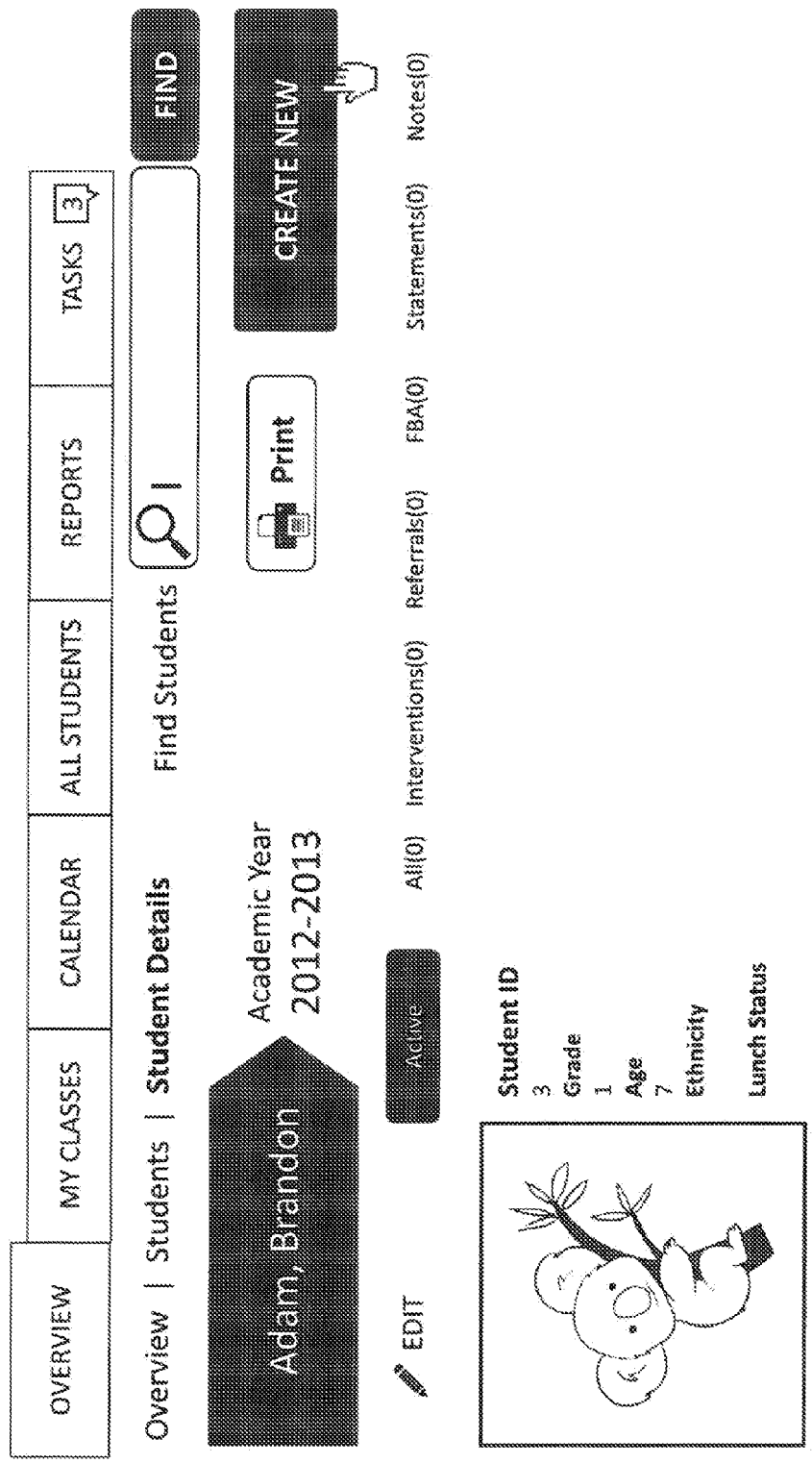
FIG. 33 illustrates a screen shot showing a user interface for viewing a particular individual's aggregate record, as provided by the present method

FIG. 32 shows a screen shot of the user interface viewable from the overview tab for a particular school. The overview page may not be visible to every user. If a user, such as a school administrator has access to the school's overview, the administrator can recognize data-patterns and easily navigate to the desired data using the overview page. For example, a user may desire to see the students within the school who received a referral. The user simply navigates by clicking on the "students" icon and then the "student details" icon, as shown in FIG. 32-33. The overview of the particular student is shown to the user.

Once an observation period is complete, a Behavior Intervention Plan can be implemented. The inputs relating to the Behavior Intervention Plan are provided in a series of screen shots (FIGS. 34-48), however, it is preferable that these inputs are located on one page so that the user can easily scroll up and down the page to view the inputs. The relevant figures illustrate a series of inputs including: (1) selecting the related FBA, (2) populating the behavioral summary, (3) providing a replacement behavior, (4) providing preventive strategies; (5) inputting environment interventions, (6) inputting instructional interventions, (7) providing reinforcement procedures, (8) progress monitoring, and (9) any other notes.

Figure 34:
FIG. 34 illustrates a screen shot showing a user interface for inputting a functional behavioral assessment, as provided by the present method.
Figure 47:
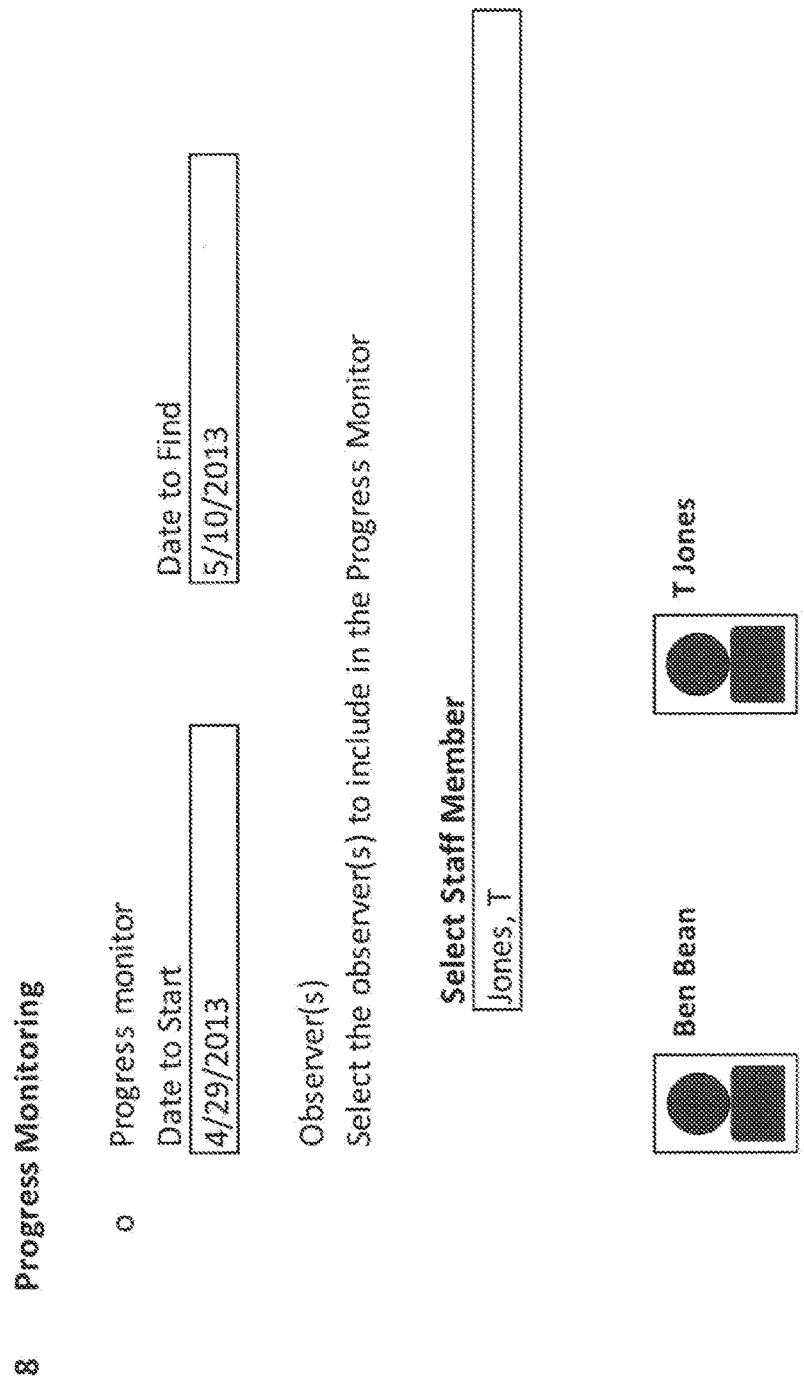
FIG. 47 illustrates a screen shot showing entered inputs for progress monitoring, as provided for the present method.

The related steps are described with reference to FIGS. 34-48. FIG. 34 is a screen shot showing a user interface which assists the user in entering a "Behavior Intervention Plan". The user selects a related FBA. The selected FBA retrieves data from a database and populates the Behavioral Summary (also illustrated in FIG. 35) based on the observation data previously collected and written to that database. A replacement behavior is selected as shown in FIG. 36. Next, as illustrated in FIG. 37-38, the user inputs preventative strategies, which provide instructions in real-time for teaching the replacement behavior. The user provides input relating to "Environment Interventions," which is illustrated in FIG. 39. The user provides for whether particular adjustments can be made to the student's environment to possibly reduce the occurrence of the problem behavior. FIG. 40-42 shows that the method provides inputs relating to instructional interventions. The questions present options for the user to provide instruction to assist the student in demonstrating the replacement behavior and direct the teacher to instruct the student in relation to the replacement behavior. In step 7, FIGS. 43-45 show a series of questions and inputs relating to reinforcement procedures. Progressing monitoring is addressed in FIGS. 46 and 47, which allows the user to select the dates of monitoring and the selected observers for monitoring the progress. Finally, a notes section is provided in order to make any other relevant notes that may be needed for the Behavioral Intervention Plan.

Figure 49:
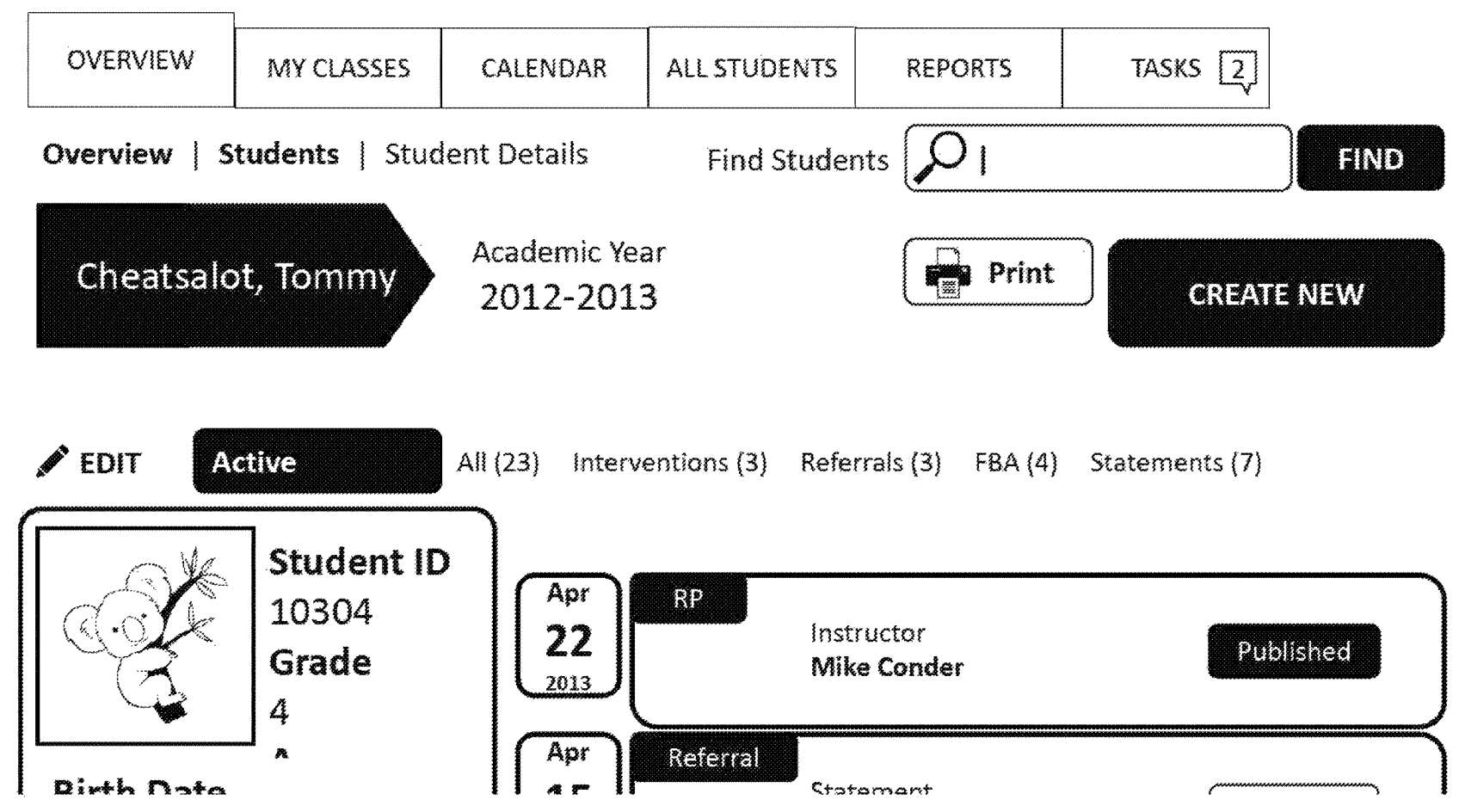

As illustrated in the screen shot shown in FIG. 49, the plan can be published and assigned by a user. The task may be assigned and another user (such as one of the listed observers) may receive a task notification. This will allow the observer to note that they have received notes and a plan to implement with a particular student. Thus, allowing communication of the plan from one user to another in a simple and efficient manner.

The present system and method provides many advantages over previous methods. For example, all data is tracked in a central database(s) or other storage medium so that the data is aggregated and can be used in a manner to provide the student being observed or assessed with the most chance of successfully modifying the data and identifying the constants in the student's interaction with the environment.

The preceding description contains significant detail regarding the novel aspects of the present invention. It should not be construed, however, as limiting the scope of the invention but rather as providing illustrations of the preferred embodiments of the invention. As an example, computer program product 10 may be stored and executed on an individual computer and/or the data may be stored on a data storage device other than a database server. Further, the device in which the user accesses the computer program product and web-site may be based on the interaction between a tablet device, smart phone and/or other computing device. The device on which access is provided may be via any connection, such as a web application or application programming interface.

Having described my invention, I claim:

1. A computer-implemented method having a computer program product, comprising a computer usable medium having a computer readable program code embodied therein, said computer readable program code adapted to be executed to implement said computer-implemented method, comprising the steps of:
- a. providing said computer readable program code on said computer usable medium;
- b. providing a series of web pages on a client server having a plurality of interactive graphical user interface capable of providing a functional behavior assessment;
- c. wherein said series of web pages are linked to at least one database;
- d. providing a user identification matched to a client table database, wherein said client table database is capable of providing a user with a sub-set of data;
- e. providing said user with said plurality of interactive graphical user interfaces such that said user is capable of:
  - i. actively selecting an icon from a structured set of icons representing a behavior of an individual;
  - ii. actively assessing said behavior of said individual by entering data into a series of input fields relating to said behavior;
- f. storing said selections and inputs from said user within said at least one database as a set of assessment data; and
- g. compiling said set of assessment data to report to said user.

2. The method as recited in claim 1, wherein said structured sets of icons are simple visual depictions of said behavior.

3. The method as recited in claim 1, further comprising providing an interactive graphical user interface capable of allowing said user to select icons relating to an environment in which said behavior of said individual is occurring.

4. The method as recited in claim 3, wherein data relating to said behavior and said environment in which said behavior occurs are compiled such that said computer program product is capable of providing a proposed intervention to said behavior.

5. The method as recited in claim 1, further comprising providing a timer, wherein said timer is capable of recording the length of time that said behavior occurs for.

6. A computer-implemented method having a computer program product, comprising a computer usable medium having a computer readable program code embodied therein, said computer readable program code adapted to be executed to implement said computer implemented method, comprising the steps of:
- a. providing said computer readable program code on said computer usable medium;
- b. providing a series of web pages on said computer usable medium having a plurality of interactive graphical user interface;
- c. wherein said series of web pages are linked to at least one database;
- d. providing a user identification matched to a client table database, wherein said client table database is capable of providing a user with a specific sub-set of data;
- e. providing said user with said plurality of interactive graphical user interfaces;
- f. providing a first structured set of icons on said interactive graphical user interface representing a behavior of an individual for said user to monitor;
- g. allowing said user to actively select an icon from a structured set of icons that represents said monitored behavior and storing said icon that said user selected to said at least one database;
- h. providing a second structured set of icons on said interactive graphical user interface for said user to select which represents a subject that said monitored behavior is occurring during;
- i. storing said selected subject in said at least one database;
- j. providing a third structured set of icons on said interactive graphical user interface for said user to select which represents a context within which said monitored behavior is occurring;
- k. storing said selected context in said at least one database;
- l. providing a fourth structured set of icons on said interactive graphical user interface for said user to select which represents an antecedent to said monitored behavior;
- m. storing said antecedent in said at least one database;
- n. providing a fifth structured set of icons on said interactive graphical user interface for said user to select which represents a consequence of said monitored behavior;
- o. storing said consequence in said at least one database;
- p. providing a sixth structured set of icons on said interactive graphical user interface for said user to select which represents a reaction of said individual based on the environment surrounding said monitored behavior;
- q. storing said reaction in said at least one database;
- r. storing said selections and inputs from said user within said at least one database as a set of assessment data; and
- s. reporting said set of assessment data to said user.

7. The method as recited in claim 6, wherein said structured sets of icons are simple visual depictions of said behavior.

8. The method as recited in claim 6, further comprising providing an interactive graphical user interface capable of allowing said user to select icons relating to an environment in which said behavior of said individual is occurring.

9. The method as recited in claim 8, wherein data relating to said behavior and said environment in which said behavior occurs are compiled such that said computer program product is capable of providing a proposed intervention to said behavior.

10. The method as recited in claim 6, wherein said computer usable medium is a server.

11. The method as recited in claim 6, further comprising providing a timer, wherein said timer is capable of recording the length of time that said behavior occurs for.

12. A computer-implemented method having a computer program product, comprising a computer usable medium having a computer readable program code embodied therein, said computer readable program code adapted to be executed to implement said computer-implemented method, comprising the steps of:
- a. providing a plurality of web pages capable of prompting a user to enter data through a series of interactive graphical user interfaces such that said user can complete a functional behavioral assessment;
- b. providing a series of structured sets of icons relating to a behavior of an individual being assessed, wherein said series of structured sets of icons are simple visual indicators of said behavior;
- c. providing a series of structured sets of icons relating to an environment in which said behavior is occurring, wherein said series of structured sets of icons are simple visual indicators of said environment;

d. allowing said user to select from said series of structured sets of icons to record said behavior and said environment data;
e. compiling said data from said behavior and said environment;
f. prompting said user if all data required for said functional behavior assessment is not inputted; and
g. reporting said data from said behavior and said environment to said user.

13. The method as recited in claim 12, further comprising providing a timer, wherein said timer is capable of recording the length of time that said behavior occurs for.

14. The method as recited in claim 12, further comprising providing a chart illustrating said data.

15. The method as recited in claim 12, further comprising providing a graph illustrating said data.

16. The method as recited in claim 12, further comprising providing an intervention plan for said user to implement.

* * * * *